US005971280A

United States Patent [19]

Hoolhorst

[11] Patent Number: 5,971,280

[45] Date of Patent: Oct. 26, 1999

[54] CARD READING DEVICE INCLUDING A CONTACT AND A CARD CARRIER PARTS

[75] Inventor: Albert Hoolhorst, Aardenburg, Netherlands

[73] Assignee: Siemens Aktiengesellschaft, Munich, Germany

[21] Appl. No.: 08/935,147

[22] Filed: Sep. 22, 1997

[30] Foreign Application Priority Data

Sep. 20, 1996 [DE] Germany .......................... 196 38 647

[51] Int. Cl.[6] ...................................................... G06K 7/00

[52] U.S. Cl. .......................... 235/486; 235/492; 235/451; 361/737; 439/75

[58] Field of Search .................................... 235/486, 492, 235/495, 482, 451; 902/26; 361/737, 752; 439/75, 299, 300

[56] References Cited

U.S. PATENT DOCUMENTS

| | | | |
|---|---|---|---|
| 4,843,221 | 6/1989 | Ohtsuki et al. | 235/441 |
| 4,975,805 | 12/1990 | Schmutzler | 361/399 |
| 5,049,728 | 9/1991 | Rovin | 235/492 |
| 5,149,276 | 9/1992 | Dixon | 439/159 |
| 5,315,478 | 5/1994 | Cadwell et al. | 361/727 X |
| 5,430,617 | 7/1995 | Hsu | 361/818 |
| 5,526,233 | 6/1996 | Hayakawa | 361/737 |
| 5,563,400 | 10/1996 | Le Roux | 235/486 |
| 5,625,534 | 4/1997 | Okaya et al. | 361/737 X |
| 5,663,553 | 9/1997 | Aucsmith | 235/492 |
| 5,673,180 | 9/1997 | Pernet | 361/737 X |
| 5,677,524 | 10/1997 | Haghiri-Tehrani | 235/492 |

FOREIGN PATENT DOCUMENTS

| | | |
|---|---|---|
| 0282954 | 9/1988 | European Pat. Off. . |
| 0549983 | 7/1993 | European Pat. Off. . |
| 6228892 | 2/1987 | Japan . |
| 214393 | 1/1990 | Japan . |
| 5233887 | 9/1993 | Japan . |

*Primary Examiner*—Michael G. Lee

*Attorney, Agent, or Firm*—Herbert L. Lerner; Laurence A. Greenberg

[57] ABSTRACT

The card reading device has a contact carrier part and a card carrier part. The card carrier part receives a card to be read in a card receiving portion and the card carrier part can be inserted together with the card at least partially into or onto the contact carrier part. The card carrier part of the novel card reading device has a partial ejection mechanism with at least one lever. The lever is formed and disposed such that a swivel of the lever translates into an interaction between the lever and a supporting point lying outside the card carrier part. As a consequence of the interaction, the card receiving portion is at least partially drawn out or ejected from the contact carrier part.

10 Claims, 3 Drawing Sheets

CARD READING DEVICE INCLUDING A CONTACT AND A CARD CARRIER PARTS

BACKGROUND OF THE INVENTION

Field of the Invention

The invention pertains to a card reading device with a contact carrier part and a card carrier part; the card carrier part is formed with a card receiving portion for receiving a card to be read and being adapted such that it can be pushed together with the card inserted therein at least partially into or onto the contact carrier part.

Such card reading devices are, for example, the reading devices used in mobile telephones for receiving and/or passing on information provided by or for a so-called SIM card or a so-called SIM module.

SIM modules are used in mobile phones, in particular for subscriber identification. SIM is an acronym which stands for "Subscriber Identity Module". SIM modules are very well suited for use in mobile phones, in particular on account of their small dimensions (25×15 mm).

Card reading devices of the type presented herein may, however, also be card reading devices for reading "normal" chip cards.

The SIM modules, "normal" chip cards etc. which can be used in card reading devices are all cards containing chips, or chip cards, and, for the sake of simplicity, are henceforth referred to for short as cards; the operation of accepting and/or passing on information provided by or for a card is henceforth referred to, for the sake of simplicity, as reading the card.

Card reading devices, which comprise a contact carrier part and a card carrier part, which can be pushed into the latter or onto the latter, are well suited, inter alia, for use in mobile phones. This is so because, on the one hand, they are easy to operate and, on the other hand, they are very small.

Such card reading devices are easy to operate because the cards to be read can in each case be introduced into the card reading devices from outside, in other words without removing the battery or the like.

The card reading devices are small because, for example, the contact elements of the contact carrier part which are provided for establishing contact with the card to be read can be prevented from being short-circuited during the pushing in and removal of the card to be read into and out of the contact carrier part by the card (its contact areas) essentially by a special configuration of the card carrier part alone, in other words without large and complex mechanics.

On the other hand, however, in the case of such card reading devices the measures to be taken for removing the card carrier part from the contact carrier part may prove to be relatively complex. This is because, partly for aesthetic reasons, the card carrier part generally ends flush with the housing of the unit containing the card reading device when the latter is in the pushed-in state and, as a result, offers no point of attachment at which it can be pulled out again. To be able to remove the card carrier part from the contact carrier part, a special unlocking and ejection mechanism is necessary. This unlocking and ejection mechanism generally comprises a separate ejection button which, by means of a mechanism having springs, long linkages etc., releases a possibly present arresting means of the card carrier part in the contact carrier part and/or triggers an ejection of the card carrier part out of the contact carrier part. Such unlocking and ejection mechanisms notoriously take up a relatively large amount of space and, moreover, require a considerable outlay in the production of the card reading devices.

SUMMARY OF THE INVENTION

It is accordingly an object of the invention to provide a card reading device, which overcomes the above-mentioned disadvantages of the heretofore-known devices and methods of this general type and which enables the card carrier part to be removed from the contact carrier part in a simple way using a mechanism which is small and simple in terms of its construction.

With the foregoing and other objects in view there is provided, in accordance with the invention, a card reading device, comprising:

a contact carrier part formed with a supporting point on an exterior surface thereof;

a card carrier part formed with a card receiving portion for receiving a card to be read, the card carrier part, together with the card to be read, being insertable at least partly into or onto the contact carrier part;

the card carrier part including a mechanism with at least one lever for removing the card carrier part from the contact carrier part, a swiveling of the at least one lever causing the lever to interact with the supporting point on the card carrier part and an at least partial withdrawal of the card carrier part from the contact carrier part.

In other words, the card carrier device has a partial ejection mechanism with at least one lever. The lever is formed and disposed such that a swivel thereof and an interaction with a supporting point lying outside the card carrier part cause the card receiving portion to be at least partially withdrawn from the contact carrier part.

In accordance with an added feature of the invention, the contact carrier part has an unlocking portion connected to the card receiving portion, the mechanism with the at least one lever being accommodated in the unlocking portion of the card carrier part.

In accordance with an additional feature of the invention, the card carrier part is inserted into or onto the contact carrier part along a given insertion direction, and the unlocking portion is disposed at a trailing end of the card carrier part with respect to the insertion direction.

In accordance with a further feature of the invention, the at least one lever of the mechanism is one of two mutually adjacent rocker levers. Each of the rocker levers may be formed with a supporting element resting against the contact carrier part in a state in which the card carrier part has been inserted into or onto the contact carrier part.

In accordance with another feature of the invention, the rocker levers have mutually facing arms connected to each other by an at least partially elastic rocker lever actuating portion.

In accordance with again an added feature of the invention, the rocker lever actuating portion is formed with a pressure-applying portion such that a pressure force exerted on the pressure-applying portion effects a swiveling of the rocker levers about the supporting elements.

In accordance with again another feature of the invention, the rocker levers include mutually averted arms connected to the card receiving portion via elastic connecting elements.

In accordance with a concomitant feature of the invention, connecting elements connect the unlocking portion to the card receiving portion.

The ejection mechanism is thus integrated in the card carrier part to be ejected itself. It is possible for the ejection element ejecting the card carrier part, namely the at least one lever, to be at the same time that element of the ejection mechanism via which, or in the direct vicinity of which, the ejection mechanism can be actuated from outside the card reading device.

As a result, the ejection mechanism according to the invention can be made up of a minimal number of individual parts, which furthermore—unlike the prior art—can be arranged lying closely together and can be accommodated in their entirety in a very confined space. In particular if produced from plastic, it can even be formed together with the card carrier part as a one-piece unit.

The invention thus provides a card reading device of which the card carrier part can be removed from the contact carrier part in a simple way using a mechanism which is small and of a simple construction.

The fact that the ejection mechanism is provided in the card carrier part (which can be removed from the card reading device) makes it possible in an extremely simple way to examine, test, service, repair and/or exchange the ejection mechanism.

Other features which are considered as characteristic for the invention are set forth in the appended claims.

Although the invention is illustrated and described herein as embodied in a card reading device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The card reading device described below is a card reading device adapted to read SIM modules. This does not mean, however, that the invention is restricted to card reading devices designed for this purpose. It will be understood by those versed in this field that the invention can also be used with card reading devices for reading any other cards (chip cards).

In the exemplary embodiment illustrating the best mode, the card reading device comprises a contact carrier part and a card carrier part; the card to be read by the card reading device is inserted into the card carrier part and is pushed together with the latter into the contact carrier part.

Figure 1:
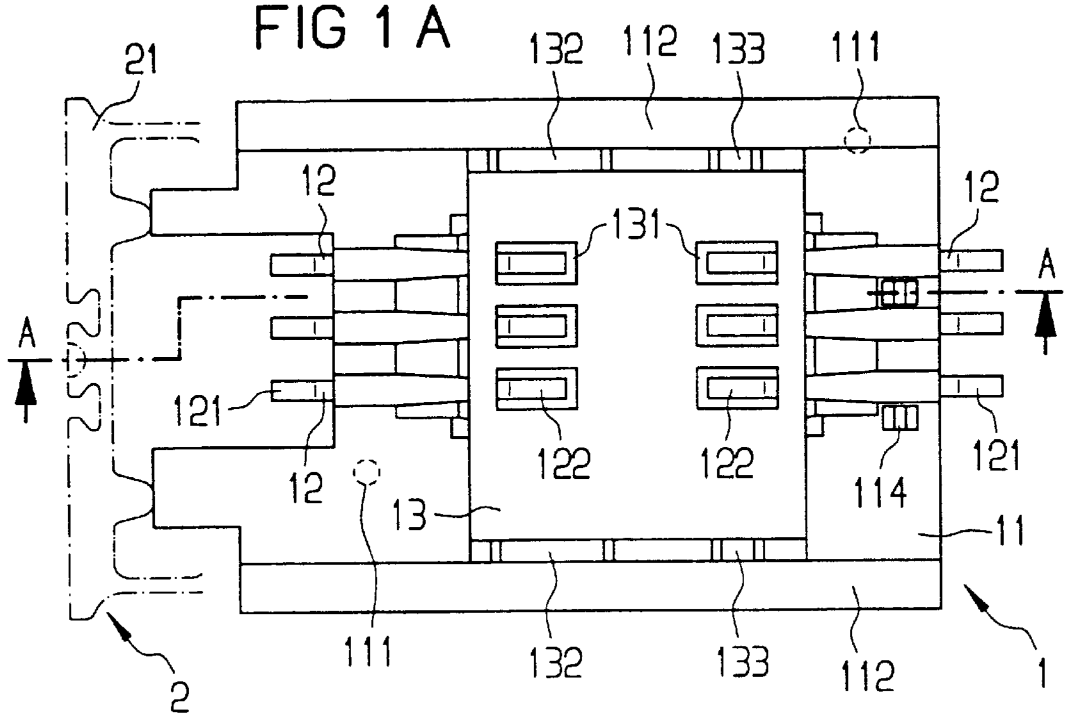
FIG. 1A is a plan of a contact carrier part of a card reading device according to the invention.
FIG. 1B is a sectional view of the contact carrier part of FIG. 1A taken along the line A—A.
FIG. 1C is a side elevational view of the contact carrier part of FIGS. 1A and 1B.
Figure 1:
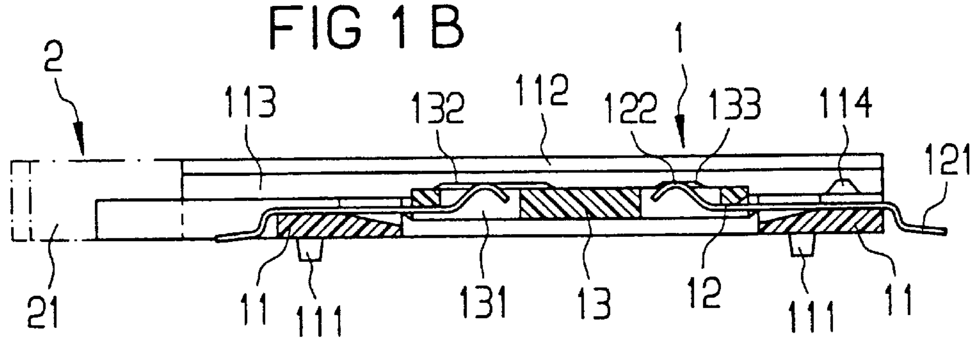
Figure 1:
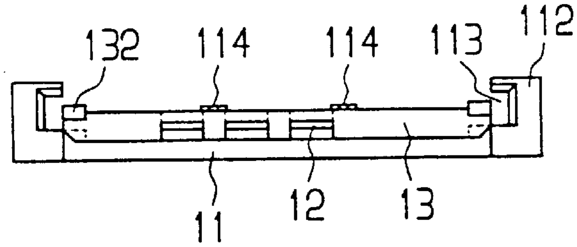

Referring now to the figures of the drawing in detail and first, particularly, to FIGS. 1A, 1B, and 1C thereof, there is seen a contact carrier part denoted by reference numeral 1. The contact carrier part 1 comprises an insulator 11, six contact elements in the form of contact springs 12 and a contact element position-changing element in the form of a plate 13.

In FIGS. 1A and 1B, parts of the card carrier part 2, described in more detail later (see FIG. 2), are also represented by dashed lines in the position in which it has been pushed into the contact carrier part 1.

The contact carrier part 1, i.e., the insulator 11 and the contact springs 12 thereof, are adapted to be mounted on a non-illustrated electrical circuit board. The insulator 11 has for this purpose, as can be seen in particular from FIGS. 1A and 1B, mounting pins 111, which can be inserted into corresponding recesses in the electrical circuit board and, if need be, can also be fastened there. The contact springs 12 are formed at one of their respective ends as soldering lugs 121, which can be soldered to the circuit board, for example using an SMT soldering process.

The insulator 11 is that component of the contact carrier part 1 which holds the latter together, to be more specific its other components, and makes it possible for it to interact in the intended way with the card carrier part 2.

The last-mentioned function of the insulator 11 may be performed by the latter, in particular, by the provision of groove-like clearances 113 in raised marginal portions 112 on mutually opposite sides of the insulator 11. The (mutually facing) groove-like clearances 113 may serve, as can be seen in particular from FIG. 1C, as a guide for the card carrier part 2 which is to be brought into engagement with the contact carrier part 1 (by pushing one over the other or one into the other) and is described in still further detail later. The direction along which the card carrier part 2 must be moved in relation to the contact carrier part 1 in order to be pushed into the latter is the direction running horizontally to the right in FIGS. 1A and 1B and into the plane of the drawing in FIG. 1C.

Each of the contact springs 12 has an elastically deformable (movable) dome-shaped end portion 122. The end portion 122 is in each case that part of the contact springs 12 by which the latter come into contact with the contact regions (surface contacts) of the card(s) to be read.

The contact springs 12 are partially covered by the plate 13. The plate 13 has clearances 131, through which the end portions 122 of the contact springs 12 protrude.

The clearances 131 are positioned in such a way that the end portions 122 of the contact springs meet exactly with the contact regions of the card to be read when the latter is in its reading position within the card reading device. In the example considered—the card to be read is an SIM module—altogether there are provided six contact springs 12, which are arranged in two rows, each comprising three contact springs 12.

The plate 13 has on each of its sides facing the raised marginal portions 112 of the insulator 11 elevations 132 and 133, which extend essentially parallel to the raised marginal portions 112 at a small distance from them and, as can be seen in particular from FIGS. 1B and 1C, partially cover the groove-like clearances 113 provided in the marginal portions 112.

The elevations 132 and 133 of the plate 13 present an obstruction when the card carrier part 2 is pushed into the groove-like clearances 113 of the contact carrier part 1. The plate 13 can, however, as will be described in still more detail, be pressed out of the way toward the circuit board by the card carrier part 2. This has two effects: on the one hand, the card carrier part 2 can then be pushed essentially unhindered into the contact carrier part 1 and, on the other hand, the pressing away of the plate 13 causes not only the plate itself but also the contact springs 12 (in particular their end portions 122) to be pressed away.

The pressing away of the contact springs 12 is effected by the pressing away of the plate 13; the contact springs 12, to be ore specific their end portions 122 in particular, are taken long by the plate 13.

The pressing away of the plate 13 by the card carrier part 2 is effected by elevations of the card carrier part 2, which run over the elevations 132 and 133 of the plate 13, pressing the latter away, when the card carrier part 2 is pushed into the contact carrier part 1. In order that the elevations of the card carrier part 2, which are inherently at the same height as the elevations 132 and 133 of the plate 13, can run over the latter with little resistance, the elevations 132 and 133 have, as can be seen in particular from FIG. 1B, run-up slopes at their front and rear ends.

In the state in which the card carrier part 2 has been pushed fully into the contact carrier part 1, a card (to be read) received in the card carrier part 2 is automatically in its reading position. In this state, the elevations of the card carrier part 2 have crossed over the elevations 132, 133 of the contact carrier part 1 to such an extent that the active pressing away of the plate 13 by the card carrier part 2 is ended. The plate 13 is pressed back in the direction of its original position by the spring force of the contact springs 12, to be precise until the latter, i.e., their dome-like end portions 122, reach the contact regions of the card to be read and thereby establish contact with them.

In order that the card carrier part 2 cannot simply fall out of the contact carrier part 1, the insulator part 11 of the contact carrier part 1 has one or more latching elements in the form of detents 114, which engage with assigned latching elements (latching depressions) of the card carrier part 2 in the state in which the card carrier part 2 has been pushed fully into the contact carrier part 1.

Figure 2A:
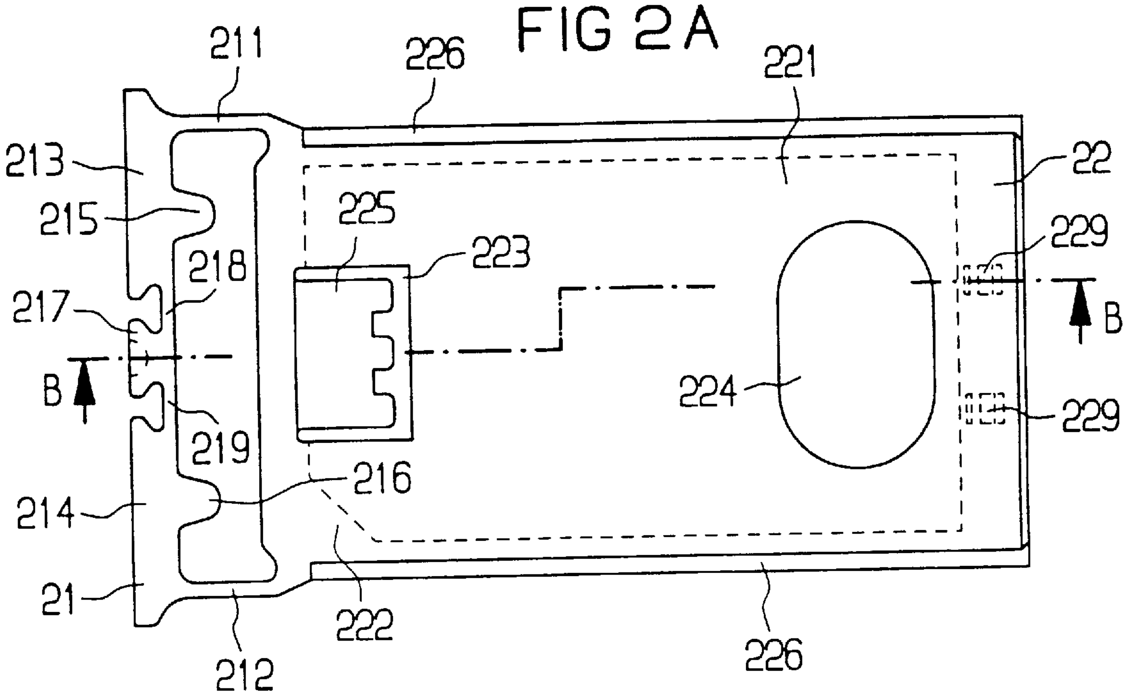
FIG. 2A is a plan view of a card carrier part of the card reading device according to the invention.
Figure 2B:
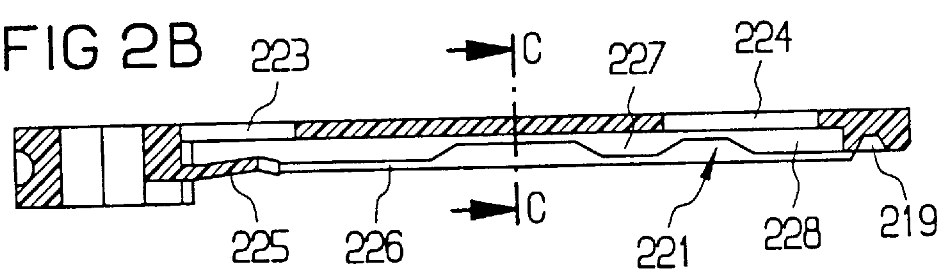
FIG. 2B is a sectional view of the card carrier part of FIG. 2A taken along the line B—B.
Figure 2C:
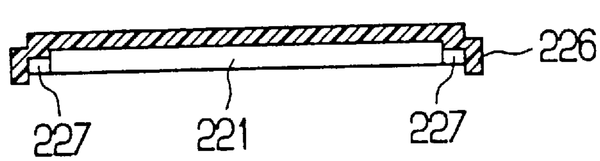
FIG. 2C is a sectional view of the card carrier part taken along the line C—C in FIG. 2B.

Referring now more specifically to FIGS. 2A, 2B and 2C, the card carrier part 2 is denoted by the reference numeral 2. The card carrier part 2 is of one-piece construction, it has an unlocking portion 21 and a card receiving portion 22.

With particular reference to FIG. 2A, the card receiving portion 22 is formed with a trough-like depression 221, which is represented there by dashed lines. The depression 221 serves as a card supporting area into which the card to be read can be inserted. The trough-like depression 221 is adapted to the shape of the card to be read. In accordance with the SIM modules to be used in the exemplary embodiment, it has a so-called coding slope 222, which prevents the SIM module from being placed into the trough-like depression 221 in the wrong orientation.

The base of the trough-like depression 221, as can be seen in particular from FIGS. 2A and 2B, has openings 223 and 224 formed therein, which make it possible to push a card inserted into the trough-like depression 221 out of the trough-like depression 221 from the remote side of the base and thereby remove the card from the card carrier part 2.

From the edge of the trough-like depression 221 there proceeds an elastically deformable (bendable) tongue element 225, which extends at least partially beyond the trough-like depression 221.

A card to be read must be pushed in between the tongue element 225 and the base of the trough-like depression 221 if it is to be inserted properly (as intended) into the card carrier part 2.

For inserting the card between the tongue element 225 and the base of the trough-like depression 221, the tongue element 225 can be bent elastically upward, and, in the state in which the card has been inserted as intended into the trough-like depression 221, the tongue element 225 presses the card against the base of the trough-like depression 221.

With particular reference to FIG. 2C, the card receiving portion 22 has raised marginal portions 226 on its sides facing the raised marginal portions 112 of the contact carrier part 1 when the card carrier part 2 is pushed into the contact carrier part 1.

The marginal portions 226 are shaped outward in such a way that, when the card carrier part 2 is pushed into the contact carrier part 1, they run in the groove-like clearances 113 of the contact carrier part 1 and are guided therein.

The inwardly facing regions of the marginal portions are, as can be seen in particular from FIGS. 2B and 2C, provided with elevations 227 and 228, which are positioned and shaped in such a way that, when the card carrier part 2 is pushed into the contact carrier part 1, they run over the elevations 132 and 133 of the plate 13 of the contact carrier part 1 and, accompanying this action, press the plate 13 together with the dome-like end portions 122 of the contact springs 12 of the contact carrier part 1 out of the pushing-in path. Like the elevations 132 and 133 of the contact carrier part 1, the elevations 227 and 228 of the card carrier part 1 are provided with run-up slopes.

The function and mode of operation of the elevations 227 and 228 and their interaction with the elevations 132 and 133 of the contact carrier part 1 have already been described at length in the description of the contact carrier part 1 and do not require any further explanation at this stage.

The card carrier part 2, i.e., its card receiving portion 22, has at its front end, with respect to the insertion direction, one or more latching elements in the form of latching depressions 229, which engage with the detents 114 of the contact carrier part 1 in the state in which the card carrier part 2 has been pushed into the contact carrier part 1 and, as a result, prevent unintentional removal of the card carrier part 2 from the contact carrier part 1.

The releasing of this latching connection can be accomplished with the aid of the previously mentioned unlocking portion 21 of the card carrier part 2.

The unlocking portion 21 is connected by two elastically deformable connecting elements 211 and 212 thereof to the card receiving portion 22. If the card carrier part 2 is produced from plastic, then the connecting elements 211 and 212 may be designed as film hinges or web hinges.

Apart from the connecting elements 211 and 212, the unlocking portion 21 also has two adjacent rocker levers 213 and 214 and a rocker lever actuating portion between them; the connecting elements 211 and 212 are connected to the mutually averted arms of the rocker levers 213 and 214.

If the unlocking portion 21 is produced from plastic, then the rocker levers 213 and 214 may be designed "simply" as rigid, i.e., essentially not elastically deformable, portions of the unlocking portion 21.

The first rocker lever 213 has, approximately in its center, a supporting element 215, which abuts against the contact carrier part 1 in the state in which the card carrier part 2 has engaged with the contact carrier part 1. The second rocker lever 214 has, approximately in its center, a supporting element 216, which abuts against the contact carrier part 1 in the state in which the card carrier part 2 has engaged with the contact carrier part 1. It should be pointed out at this stage that the respective supporting elements 215, 216 do not have to be provided in each case at the center of the respective rocker levers 213 and 214, but may also proceed from any other points of the respective rocker lever, in particular depending on the desired or required leverages. The supporting elements 215 and 216 also do not have to strike necessarily against the contact carrier part 1. They may also strike elsewhere, for example against part of the unit in which the card reading device according to the invention is installed.

The supporting elements 215 and 216 and the points at which they strike (supporting points) are designed in such a way that swivelling movements of the rocker levers 213 and 214 are not hindered by excessive friction or by canting of the supporting elements 215 and 216 on the supporting points.

The mutually facing arms of the rocker levers 213 and 214 are connected to each other (elastically coupled to each other) via the rocker lever actuating portion.

The rocker lever actuating portion comprises an approximately central pressure-applying portion 217 and two elastically deformable (bendable) connecting elements 218 and 219.

The pressure-applying portion 217 is a rigid, i.e. essentially undeformable, portion of the unlocking portion 21. The exertion of a pressure force on the pressure-applying portion has the consequence, as will be described in detail, of releasing the card receiving portion 22 from the contact carrier part 1 and of partially lifting it out of the same. The pressure-applying portion 217 has, in the exemplary embodiment, at a central point, an approximately hemispherical depression, which allows the required pressure to be applied to the pressure-applying portion 217 by applying and pressing in a pointed object, such as for example a ballpoint pen.

The pressure-applying portion 217 is connected via the connecting elements 218 and 219 to the mutually facing arms of the rocker levers 213 and 214, respectively.

The connecting elements 218 and 219 are elastically deformable (bendable) portions of the unlocking portion 21. If the unlocking portion 21 is produced from plastic, then the connecting elements 218 and 219 may be designed as film hinges.

The function and mode of operation of the unlocking portion 21, constructed as described above, will now be described with reference to FIGS. 3A and 3B.

Figure 3A:
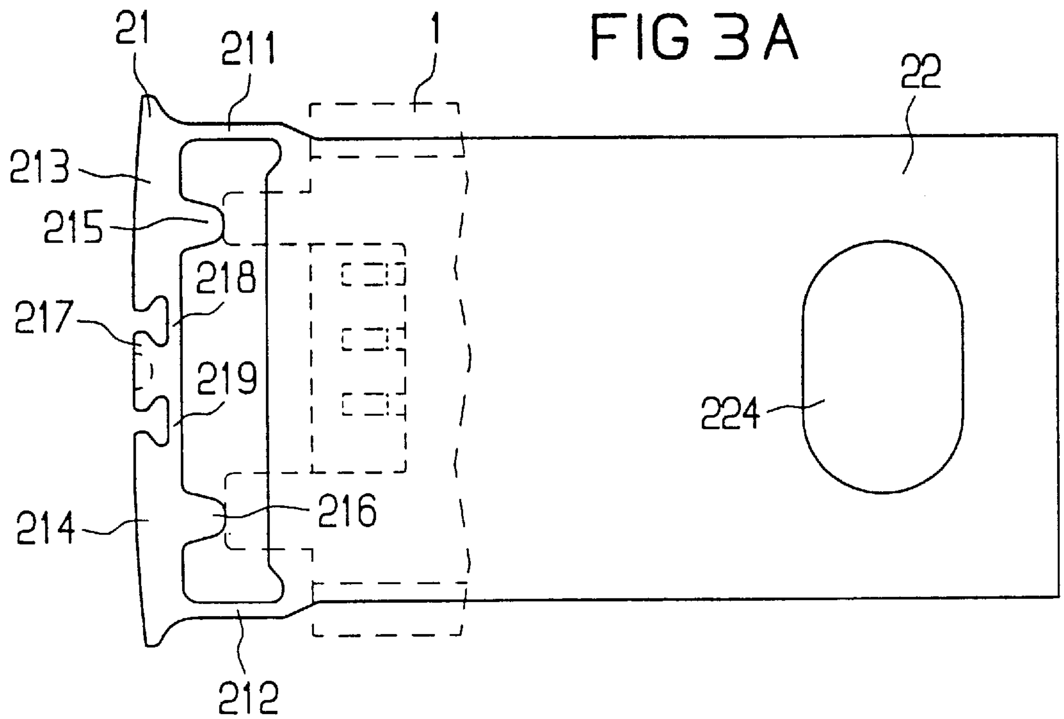
FIG. 3A is a plan view of the card carrier part in the state in which it is locked with the contact carrier part.
Figure 3B:
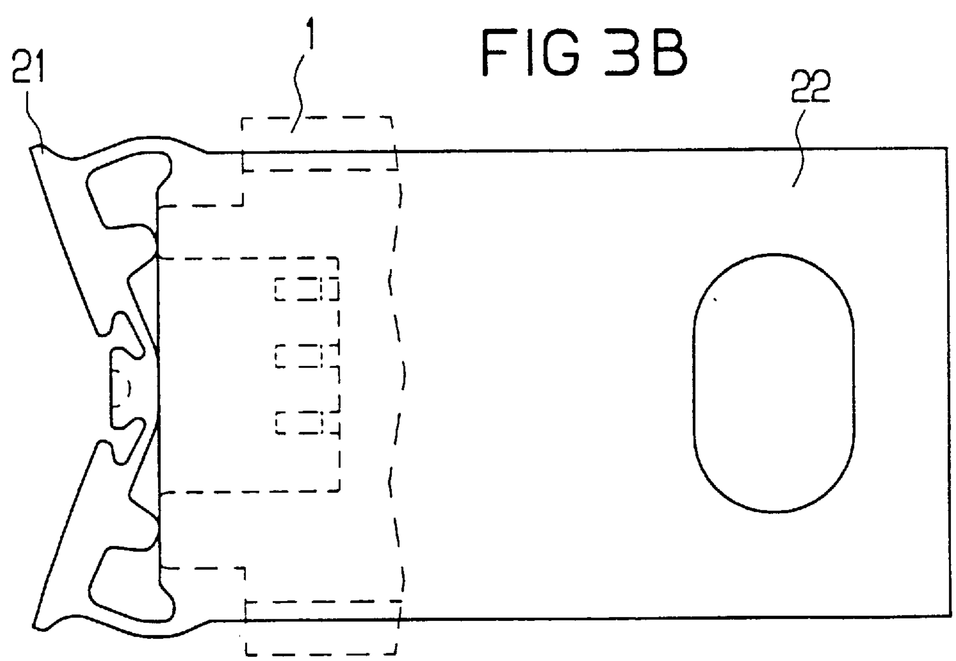
FIG. 3B is a similar view of the card carrier part during the actuation of the ejection mechanism.

FIGS. 3A and 3B each shows a state in which the card carrier part 2 has been pushed into the contact carrier part 1. The contact carrier part 1 is represented by dashed lines.

According to the representation in FIG. 3A, the card carrier part 2 has been pushed fully into the contact carrier part 1 and connected to the latter by engagement of the mutually assigned latching elements; the ejection mechanism formed by the unlocking portion 21 is not actuated and is located in its initial position or position of rest. In this state, the card carrier device 2 preferably ends flush with the housing of the unit into which the card reading device described is installed. The rocker lever actuating portion of the unlocking portion 21 is freely accessible from the left-hand side according to the representation in FIG. 3A.

As can be seen from FIG. 3A, the supporting elements 215 and 216 strike against the contact carrier part 1 in the state shown of the card carrier part 2. The points of the contact carrier part 1 or other objects against which the supporting elements 215 and 216 strike are preferably points which are designed such that they are fixed in place and cannot be deformed.

If it is wished to remove the card carrier part 2 from the contact carrier part 1, actuation of the ejection mechanism is necessary for this. The actuation of the ejection mechanism is performed by a pressure being exerted on the pressure-applying portion 217 (accessible from the outside). This can be accomplished, as already indicated above, for example by pressing a ballpoint pen or the like into the hemispherical depression of the pressure-applying portion 217.

The exertion of a pressure on the pressure-applying portion 217 causes the unlocking portion 21 of the card carrier part 2 to leave its position of rest, shown in FIG. 3A, and be deformed as a result, as shown in FIG. 3B. The deformation of the unlocking portion 21 shown in FIG. 3B is only maintained, however, as long as a pressure is exerted on the pressure-applying portion 217. If the pressure acting on the pressure-applying portion 217 is removed, the unlocking portion 21 of the card carrier part 2 returns to the initial position or position of rest shown in FIG. 3A, the card carrier part 2 then already having been pulled part of the way out of the contact carrier part 1 however, in other words the supporting elements 215, 216 no longer strike against the contact carrier part 1, unlike in the representation in FIG. 3A.

The exertion of a pressure on the pressure-applying portion 217 causes the following processes to take place in the unlocking portion 21:

The exertion of the pressure on the pressure-applying portion 217 causes the latter to be displaced in the direction of the pressure acting. The elastically bendable connecting elements 218 and 219 follow the movement of the pressure-applying portion 217 and thereby pull on the arms of the rocker levers 213 and 214, to which they are connected. The pulling on the mutually facing arms of the rocker levers has the effect that the latter pivot in opposite directions about the supporting elements 215 and 216 striking against the contact carrier part 1. This in turn has the consequence that a tractive force acts on the connecting elements 211 and 212 which connect the mutually averted arms of the rocker levers 213 and 214 to the card receiving portion 22. This tractive force acting on the connecting elements 211 and 212 has the consequence that they pull on the card receiving portion 22 of the card carrier part 2. The pulling on the card receiving portion 22 causes the originally mutually engaged latching elements 114 and 229 to disengage, and the elevations 227 and 228 of the card carrier part 2 to pass more or less simultaneously over the elevations 132 and 133 of the plate 13 of the contact carrier part 1. As a result, the card carrier part 2 (its card receiving portion 22) is thereby pulled part of the way out of the contact carrier part 1, while pressing the plate 13 away.

If the pressure acting on the pressure-applying portion 217 is removed in this state (illustrated in FIG. 3B), the elastically deformed unlocking portion 21 relaxes, and the entire card carrier part 2 is then so far out of the unit containing the card reading device described that it can be pulled completely out from the contact carrier part 1 manually by gripping the protruding part, i.e. by gripping the unlocking portion 21.

When the card carrier part 2 is removed from the contact carrier part 1, the same operations take place as was the case during pushing in. I.e., the elevations 227 and 228 of the card carrier part 2 run over the elevations 132 and 133 of the contact carrier part 1 and thereby press the plate 13 and the contact springs 12 away from them, whereby the contact springs are separated from the card, to be more specific its contact points, and the risk of a short-circuit is eliminated.

The ejection mechanism described can be realized as a compact mechanism, with a minimal number of separate and individual parts.

In the case of the ejection mechanism described, two adjacent rocker levers are used. Even if this may appear to be the most advantageous embodiment at present, not least because of the particular reliability in practical use and the fact that it is simple to produce, there is nevertheless no restriction to this. Rather, many modifications are conceivable. For example, the provision of only a single rocker lever and/or the use of other types of levers instead of the rocker levers used may also be considered.

In summary, there is provided in accordance with the invention a card reading device with a card carrier part that can be removed from the contact carrier part in a simple way using a mechanism which is small and of a simple construction.

I claim:

1. A card reading device, comprising:

a contact carrier part formed with a supporting point on an exterior surface thereof;

a card carrier part formed with a card receiving portion for receiving a card to be read, said card carrier part, together with the card to be read, being insertable at least partly into or onto said contact carrier part;

said card carrier part including a mechanism with at least one lever for removing said card carrier part from said contact carrier part, a swiveling of said at least one lever causing said lever to interact with said supporting point on said card carrier part and an at least partial withdrawal of said card carrier part from said contact carrier part.

2. The card reading device according to claim 1, wherein said contact carrier part has an unlocking portion connected to said card receiving portion, said mechanism with said at least one lever being accommodated in said unlocking portion of said card carrier part.

3. The card reading device according to claim 2, wherein said card carrier part is inserted into or onto said contact carrier part along a given insertion direction, and wherein said unlocking portion is disposed at a trailing end of said card carrier part with respect to the insertion direction.

4. The card reading device according to claim 1, wherein said at least one lever of said mechanism is one of two mutually adjacent rocker levers.

5. The card reading device according to claim 4, wherein each of said rocker levers is formed with a supporting element resting against said contact carrier part in a state in which said card carrier part has been inserted into or onto said contact carrier part.

6. The card reading device according to claim 4, wherein said rocker levers have mutually facing arms connected to each other by an at least partially elastic rocker lever actuating portion.

7. The card reading device according to claim 5, wherein said rocker levers have mutually facing arms connected to each other by an at least partially elastic rocker lever actuating portion.

8. The card reading device according to claim 7, wherein said rocker lever actuating portion is formed with a pressure-applying portion such that a pressure force exerted on said pressure-applying portion effects a swiveling of said rocker levers about said supporting elements.

9. The card reading device according to claim 4, wherein said rocker levers include mutually averted arms connected to said card receiving portion via elastic connecting elements.

10. The card reading device according to claim 9, including connecting elements connecting said unlocking portion to said card receiving portion.

* * * * *